(12) United States Patent
Higgins et al.

(10) Patent No.: US 7,108,782 B1
(45) Date of Patent: Sep. 19, 2006

(54) MARINE VESSEL ONBOARD WASTEWATER TREATMENT SYSTEM

(75) Inventors: James E. Higgins, Bethesda, MD (US); John H. Benson, Ellicott City, MD (US); Peter J. Schauer, Gaithersburg, MD (US); Jack L. McCrea, Pittsburgh, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 356 days.

(21) Appl. No.: 10/607,143

(22) Filed: Jun. 27, 2003

(51) Int. Cl.
*C02F 1/32* (2006.01)
*C02F 3/06* (2006.01)
*C02F 11/00* (2006.01)
(52) U.S. Cl. .................. 210/151; 210/170; 210/194; 210/259; 210/321.69; 210/242.1
(58) Field of Classification Search ............... 210/170, 210/151, 194, 259, 321.69, 242.1
See application file for complete search history.

(56) References Cited

U.S. PATENT DOCUMENTS 5,275,732 A * 1/1994 Wang et al. ............... 210/601
6,361,695 B1 * 3/2002 Husain et al. ............. 210/614

* cited by examiner

*Primary Examiner*—Terry K. Cecil
(74) *Attorney, Agent, or Firm*—Jacob Shuster

(57) ABSTRACT

Shipboard wastewater undergoes treatment within an automatic system based on membrane bioreactor technology. Bacteria that are naturally present in the raw waste stream break down during treatment and consume organic material in the wastewater. Membranes in a bioreactor within which the wastewater is treated provide a physical barrier, retaining the bacteria and other solids while producing an effluent sufficiently clean to be discharged directly overboard. To ensure adequate treatment, a flow-through ultraviolet disinfection unit is employed in the system downstream of filtration. Inorganic and other non-biodegradable material that accumulates in the bioreactor with time is removed automatically to maintain the desired solids concentration in the bioreactor. Using selective control established through the operator interface, the system can be operated under automatic process/standby mode or maintenance mode, and sludge concentrate can be directed either overboard, to an onboard storage tank or to undergo further treatment within a concentration device or destruction within an incinerator for example, depending on the ship's equipment, location and operating conditions.

3 Claims, 3 Drawing Sheets

MARINE VESSEL ONBOARD WASTEWATER TREATMENT SYSTEM

The present invention relates generally to treatment of wastewater onboard a marine vessel from which cleansed wastewater effluents are discharged.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

Marine vessels are presently required by Federal Regulations to have certified sanitation devices installed to hold or treat sewage. There are four general types of such sanitation devices categorized as "flow-through and discharge" devices and "non-flow-through" devices. The "flow-through and discharge" devices receive and treat sewage, producing an effluent that meets specified fecal coliform (FC) population and total suspended solids (TSS) limits. The "non-flow-through" devices are designed to collect and hold either sewage only, or a combination of graywater and sewage, depending on the system design, to enable the ship to transit restricted navigable waters. Graywater is defined as wastewater from showers, sinks, laundry, galley and scullery sources. No wastewater treatment is performed in the "non-flow-through" type of systems.

Both commercial and military vessels frequently travel to foreign ports which have discharge regulations that are so restrictive as to establish limits not only for TSS and FC, but also for biochemical oxygen demand (BOD). A reduction of BOD to specified limits can only be achieved through selected methods of treatment. It is therefore an important object of the present invention to provide a system for marine vessels including U.S. Navy ships that will collect and treat both graywater and sewage, producing a clean effluent that satisfies current and anticipated limits for BOD, TSS, and FC.

SUMMARY OF THE INVENTION

Pursuant to the present invention, a highly automated shipboard wastewater treatment system based on membrane bioreactor technology has been developed. Wastewater is treated in sequential processes, involving biological pre-treatment, membrane separation, and ultraviolet (UV) disinfection. Pre-treatment occurs in a bioreactor tank wherein bacteria naturally present in the raw waste stream break down and consume organic material in the wastewater. Aeration is supplied to the bioreactor via diffusers to sustain the bacterial population. Membranes in the bioreactor provide a physical barrier, retaining the bacteria and other solids therein while producing an effluent sufficiently clean to be discharged directly overboard. To ensure adequate treatment, a flow-through ultraviolet disinfection unit is employed downstream of filtration, further reducing fecal coliform concentrations in the effluent. Inorganic and other non-biodegradable material that accumulates in the bioreactor with time is removed automatically to maintain the desired solids concentration in the bioreactor. The system accommodates diverse types of membranes.

BRIEF DESCRIPTION OF THE DRAWING

A more complete appreciation of the invention and many of its attendant advantages will be readily understood by reference to the following detailed description when considered in connection with the accompanying drawing wherein.

BRIEF DESCRIPTION OF THE PREFERRED EMBODIMENT

Figure 1:
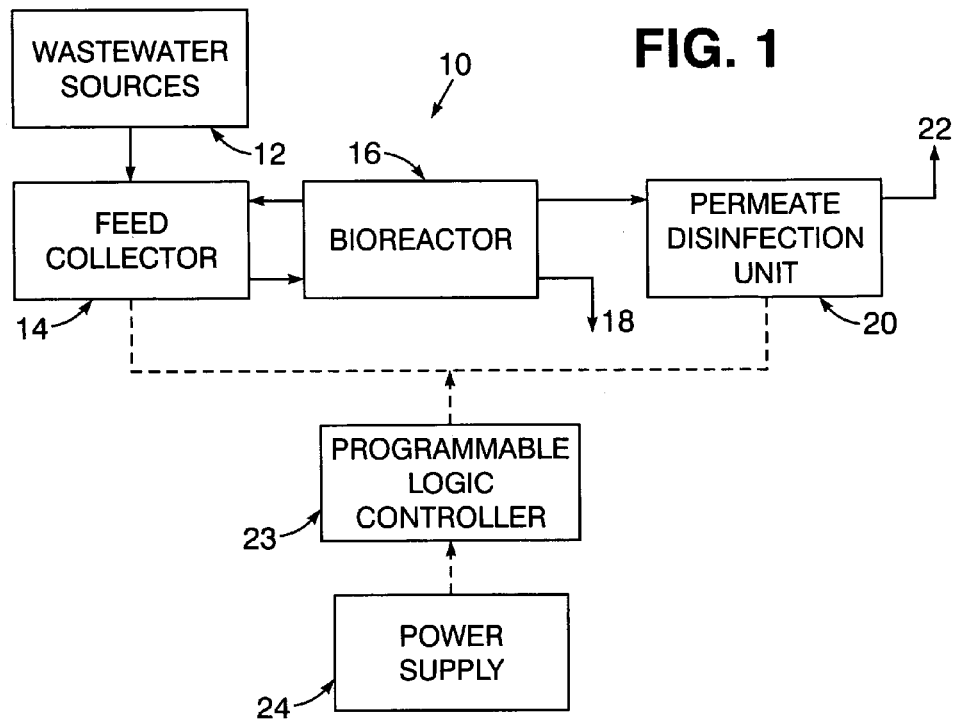
FIG. 1 is a schematic diagram of a wastewater treatment system associated with the present invention.

As diagrammed in FIG. 1, a wastewater treatment system 10 is provided for processing raw sewage and graywater on-board a marine vessel to form several different sources 12 of wastewater that is fed into a feed collector component 14. Specific fractions of the sewage and graywater within the wastewater from the sources 12 vary in accordance with the generation thereof. The feed collector 14 supplies the wastewater to a bioreactor component 16 within which biological pre-treatment of organic matter takes place. Following such bioreactor pre-treatment, membranes located in the bioreactor 16 separate solids and bacteria from a clean effluent stream. The separated solids and bacteria are fed into a permeate extraction component unit 20 by ultraviolet light producing an effluent 22 suitable for overboard discharge. Non-biodegradable material is separately removed automatically from the bioreactor 16 as sludge 18 to maintain necessary conditions for continued treatment. Operation and control of the feed collector 14, the bioreactor 16 and the permeate disinfecting extraction component 20 are achieved by means of a programmable logic controller (PLC) 23, and through which all components of the system 10 are supplied with electricity from a power supply 24.

Figure 2:
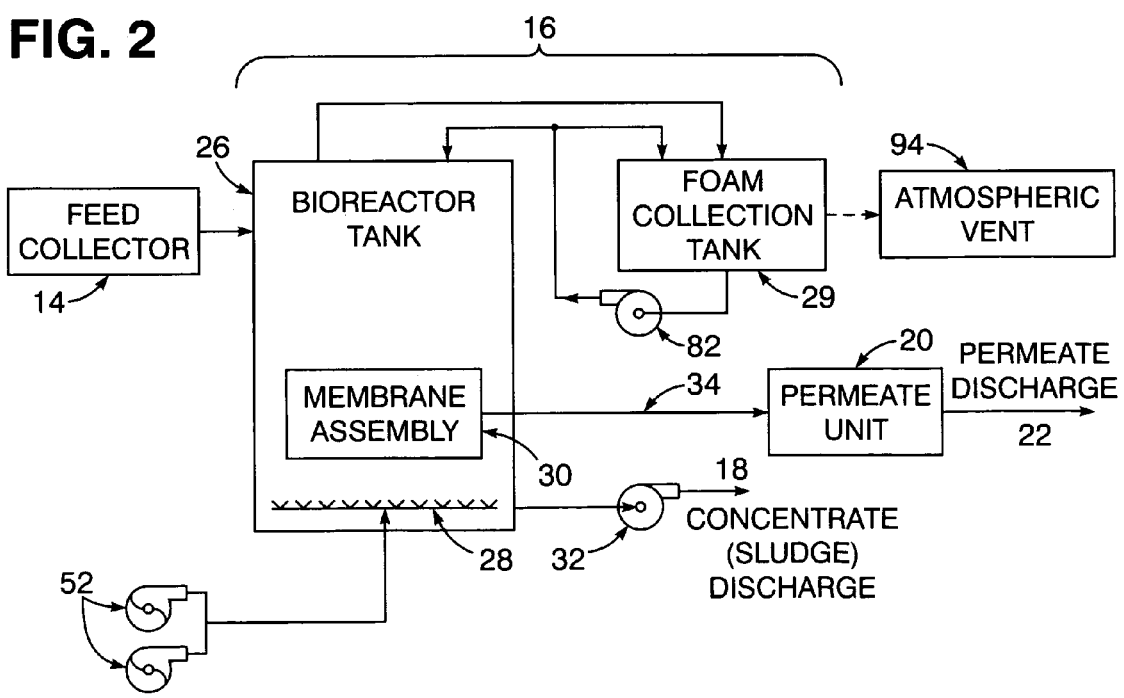
FIG. 2 is a schematic diagram of a portion of the wastewater treatment system illustrating in greater detail a bioreactor component thereof.

As diagrammed in more detail in FIG. 2, the bioreactor component 16 includes a tank 26, of roughly 1100 gallons capacity for giving the system 10 a 75-person size capacity. Aeration is supplied by duty and back-up blowers 52 through a network of diffusers 28 located at the bottom of the tank 26, to sustain the bacterial population therein. Any foam that is generated in the bioreactor tank 26 as a byproduct of treatment flows by gravity into a foam collection tank 29, wherein it collapses and is pumped by a positive displacement foam condensate pump 82 back into the bioreactor tank 26. The foam tank 29 is approximately 200 gallons in capacity for the same 75-person size system 10 and is vented to atmosphere at an overboard connection via a vent 94. Located inside the bioreactor tank 26 is a membrane module assembly 30, which extracts clean permeate from the biomass through filtration for delivery through plumbing conduit 34 to the permeate disinfection unit 20. A positive displacement sludge pump 32 removes non-biodegradable sludge 18 from the bioreactor tank 26 automatically, and pumps it either overboard, to a holding tank, or to an onboard concentration or destruction device such as an incinerator depending on the ship's location.

Figure 3:
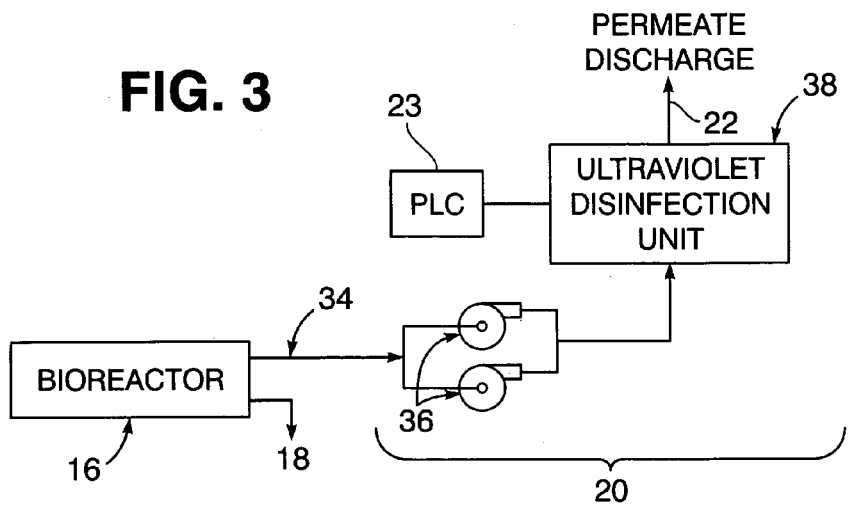
FIG. 3 is a schematic diagram illustrating in greater detail the permeate extraction unit associated with the system.

As shown in FIG. 3, the permeate disinfection unit 20 connected by the plumbing conduit 34 to the bioreactor 16, has two positive displacement duty and backup permeate pumps 36 and an ultraviolet disinfection unit 38 connected to the discharge piping 22. The permeate pump 36 draws permeate through the membranes in the bioreactor 16 at a sub-atmospheric pressure and delivers the flow to the ultraviolet unit 38. Operation of the ultraviolet unit 38 is controlled by the controller 23 when energized while the treatment system 10 is processing wastewater. Permeate flows over baffles inside the ultraviolet unit 38 to ensure adequate residence time for disinfection, and is directed through the plumbing for the overboard discharge of the effluent 22.

Figure 4:
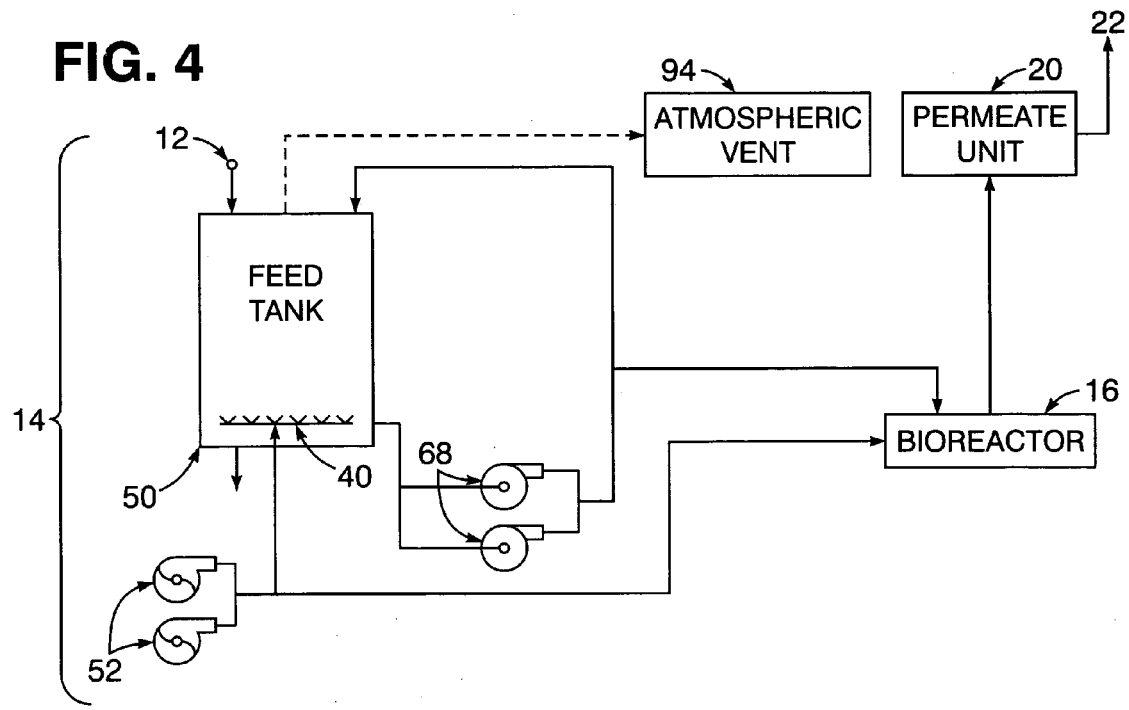
FIG. 4 is a schematic diagram illustrating in greater detail the feed collection transfer component of the system.

As diagrammed in greater detail in FIG. 4, the feed collector component 14 includes a tank 50, having a capacity of 750 gallons for the same 75-person system 10. Aeration from the same two blowers 52 that supply the bioreactor tank 26 also supply an array of diffusers 40 at the bottom of the tank 50, for the purpose of preventing anoxic conditions in the tank 50 which could disrupt treatment system performance. The tank 50 is vented to atmosphere at an overboard connection via the vent line 94. Sewage and graywater from the onboard wastewater sources 12 supply the feed tank 50. Macerator feed pumps 68 (one duty, one backup) circulate raw wastewater within tank 50 to ensure mixed contents and reduce the size of solids particles. Based on a level demand signal from the bioreactor 16, feed is supplied by the macerator pumps 68 to the bioreactor 16 for treatment.

Figure 5:
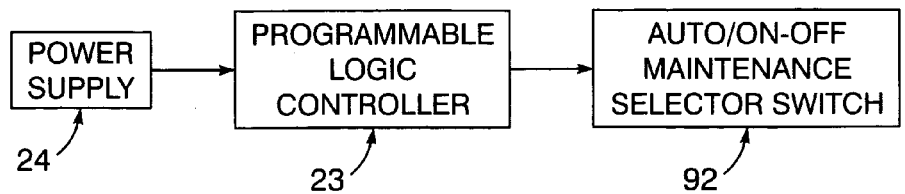
FIG. 5 is a block diagram illustrating the power control component of the system diagrammed in FIGS. 1–4.

An "Auto/Maintenance/Off selector" switch 92 as diagrammed in FIG. 5 allows the selection of one of four operational modes of the system 10, including Off, Automatic process, Automatic Standby, and Maintenance. When the system 10 is in the OFF mode (selector switch 92 in OFF position) all power to components 14, 16 and 20 is secured. All of the pumps 36, 68 and 82, blowers 52, and the UV unit 38 remain off. In the AUTO position of the selector switch 92, the automatic process mode is initiated which includes both the normal process and standby modes. In such process mode, a graphical user interface (GUI) associated with the controller 23 indicates when the working level in the feed tank 50 is reached. The macerator pump 68 as diagrammed in FIG. 4 automatically starts and circulates wastewater in the feed tank 50, delivering wastewater to the bioreactor 16 when there is a demand based on the level switches in the bioreactor 16. Pressure transducers monitor the macerator pump 68 discharge pressure for alarm and shutdown conditions due to low discharge pressure or high pressure. The bioreactor 16 receives feed from the feed tank 50. When the working level switch is reached in the bioreactor 16, the PLC 23 waits a set period of time, to allow the bioreactor level to drop. The macerator pump 68 then feeds water to the bioreactor 16 as hereinbefore indicated. During such cycle, the system 10 automatically switches between 8 minutes of permeation and 2 minutes of rest. One of the two blowers 52 will always be operating during automatic operation. Programming is provided to automatically switch all the redundant pumps and blowers from the duty pump 68 or blower 58 to the backup unit in case of failure. This cycle continues as long as the system 10 is in the automatic mode and there are no alarm conditions. The system 10 is accordingly designed to operate 24 hours per day.

An automatic feature of the controller 23 during its programmed functioning stops permeation without stopping bioreactor and membrane scouring aeration. When the system is in the standby mode, the permeate pump 36, UV unit 34, and sludge pump 32 are powered off. The blowers operate. There is no feed supplied by the feed tank 50 to the bioreactor 16, and sludge concentrate is not discharged during this cycle.

The foam condensate pump 82 operates based on the level switching and logic of the controller 23 during the standby mode of operation. If a low level is reached in the bioreactor 16 at any time during the standby mode, the foam condensate pump 82 operates until all excess liquid in the foam tank 29 (condensate above the low level) is transferred to the bioreactor 16, until the bioreactor working level is reached.

A maintenance mode is established through the power control diagrammed in FIG. 5 so as to assist with troubleshooting whereby certain portions of the operation cycle may be initiated manually through the selector control switch 92 connected to the power supply 24 through the controller 23. Maintenance personnel can thereby take redundant equipment out of service, reset run hours for selected key equipment, and choose from several standard maintenance tests. Maintenance test screens provide several pushbuttons for an operator to test the following functions:

Direct Fill Test—One complete wastewater feed cycle is performed.

Concentrate Test—Operates sludge concentrate pump for specified time interval.

Permeate Test—One, 8 minute permeate/2-minute rest cycle is performed.

Standby Test—System standby components are operated until turned off by operator.

Startup Test—48-hour period of aeration and mixing in feed tank. Conditions raw graywater in preparation for system startup.

Long Term Standby Test—Similar to standby Test, but blower is on for 5 minutes, off for 15 minutes.

Figure 6:
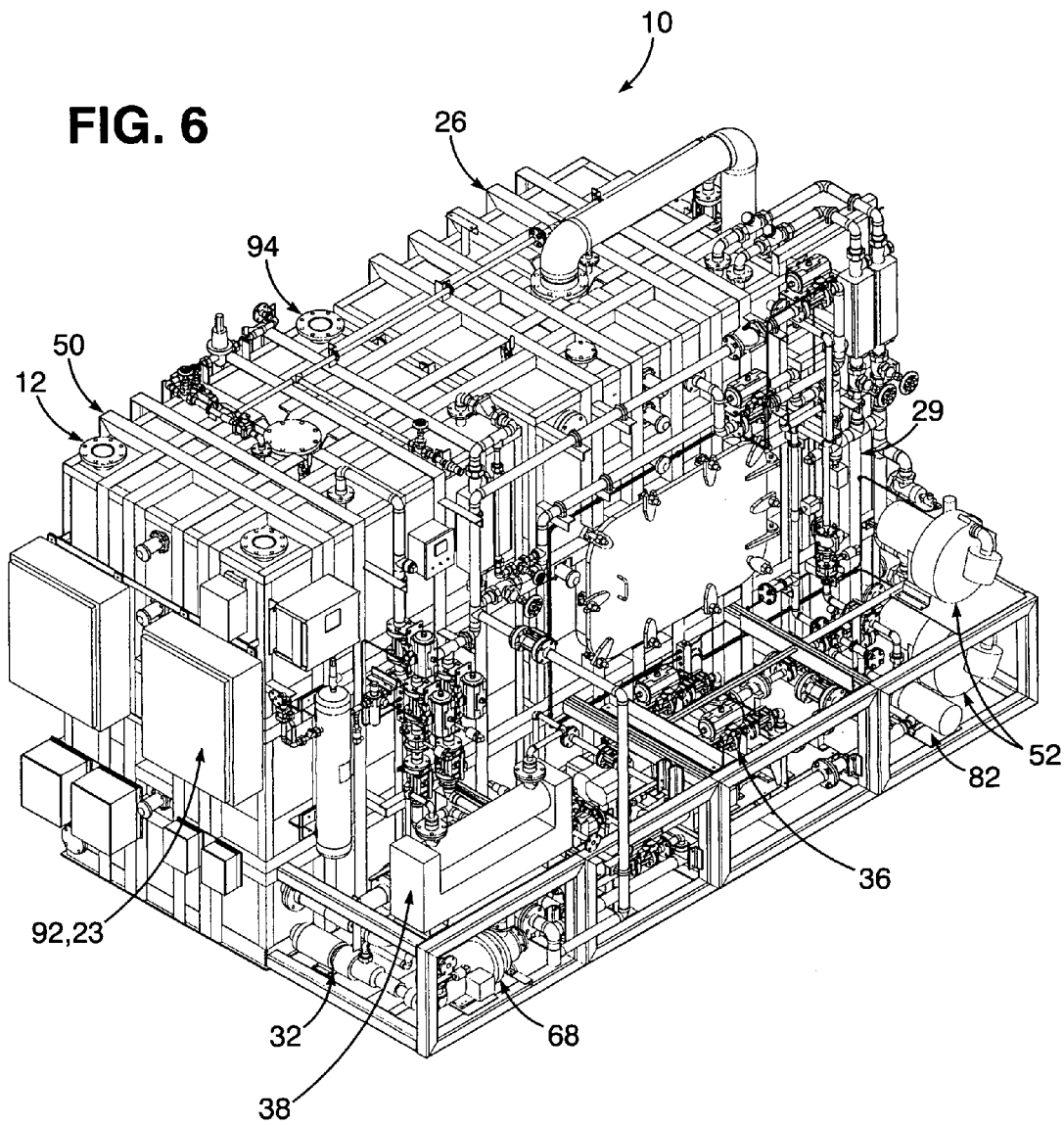
FIG. 6 is a perspective or isometric view of a physical embodiment of the treatment system diagrammed in FIGS. 1–5, with key components thereof identified by reference numerals.

FIG. 6 is an isometric view of the treatment system 10, with key components thereof labeled by reference numerals as hereinbefore referred to.

Other modifications and variations of the present invention may be possible in light of the foregoing discussion. It is therefore to be understood that within the scope of the appended claims the invention may be practiced otherwise than as specifically described.

What is claimed is:

1. A system for processing wastewater onboard a marine vessel, comprising: treatment means for receiving, holding, and treating the wastewater into a clean effluent and a sludge concentrate; plumbing means connected to the treatment means for discharging said clean effluent overboard and discharging said sludge concentrate either overboard, into an onboard holding tank or to undergo further onboard treatment, wherein said further onboard treatment includes concentration or destruction; and selective control means operatively connected to said treatment means and said plumbing means for establishing different operational modes involving said treating of the wastewater, said discharging of the clean effluent separately from said discharging of the sludge concentrate overboard based on location of the marine vessel and operating conditions of the system, said system further comprising: wastewater feed connecting means for enabling collection and temporary holding of the wastewater; ultraviolet disinfection means for reducing concentration of fecal coliform bacteria in the wastewater; bioreactor means for reception and holding of the wastewater a sufficient period of time during which naturally present bacteria consumes organic matter to allow filtration, said bioreactor means including a tank having membrane modules and diffusers therein, and aeration means for scouring surfaces of the membrane modules and sustaining bacterial population within the tank; and, vent means connected to the bioreactor means for exiting of air and foam from the tank; and means for collection of the foam from the tank and feedback thereof to the bioreactor means.

2. The system as defined in claim 1, including bioreactor means having a tank within which membrane modules are disposed and associated piping for filtering conditioned wastewater to emit a permeate stream meeting effluent quality thresholds.

3. The system as defined in claim 2, wherein the bioreactor means includes plumbing means connected to the tank for transfer thereto of sludge concentrate and temporarily holding, further concentrating or destroying by thermal means, or discharging overboard therefrom the sludge concentrate.

* * * * *